United States Patent [19]
Porter et al.

[11] 3,923,425
[45] Dec. 2, 1975

[54] FUEL PUMP SHUT-OFF VALVE

[75] Inventors: David L. Porter, Bethalto; Raymond E. Williamson, Granite City, both of Ill.

[73] Assignee: ACF Industries, Incorporated, New York, N.Y.

[22] Filed: May 30, 1974

[21] Appl. No.: 474,501

[52] U.S. Cl. .............................. 417/298; 417/507
[51] Int. Cl.² ........................................ F04B 49/10
[58] Field of Search .......... 417/507, 566, 470, 471, 417/542, 298; 123/139 AZ, 136

[56] References Cited
UNITED STATES PATENTS

| | | | |
|---|---|---|---|
| 2,018,150 | 10/1935 | Rockwell | 417/298 |
| 2,212,486 | 8/1940 | Zoder | 123/136 |
| 3,089,430 | 5/1963 | Shafer et al. | 417/315 |
| 3,224,377 | 12/1965 | Hicks | 417/542 |
| 3,368,538 | 2/1968 | Pauli et al. | 417/279 |
| 3,530,991 | 9/1970 | Phillips | 417/542 |
| 3,763,840 | 10/1973 | Schimmelpfenig | 123/136 |
| 3,811,803 | 5/1974 | Frohberg | 417/507 |

*Primary Examiner*—C. J. Husar
*Assistant Examiner*—O. T. Sessions

[57] ABSTRACT

A shut-off valve for use with the fuel pump of an automotive fuel system is operable to shut off fuel flow whenever a positive pressure exists in the fuel line from the source to the fuel pump. The shut-off valve comprises a combination inlet check valve and shut-off valve operably connected to a diaphragm member with a fuel inlet fitting interposed between the valve member and the diaphragm so that when a positive pressure is present in the inlet fitting, such pressure acting on the diaphragm forces the inlet/shut-off valve to a closed position.

10 Claims, 6 Drawing Figures

FUEL PUMP SHUT-OFF VALVE

BACKGROUND OF THE INVENTION

For various reasons, fuel leaks have been known to develop in the fuel system between an automotive fuel pump and the intake manifold of the engine. Amongst the reasons for such leakages may be enumerated improperly tightened fuel line connections, physical damage to fuel lines, malfunctioning fuel inlet valves in the carburetor and, of course, inversion of the vehicle resulting from an accident. In any of the above situations, leakage of fuel can be severe if the vehicle is at rest and the fuel tank is disposed at an elevation higher than the carburetor or engine of the car.

Under such conditions, fuel can flow by gravity from the storage tank to the fuel pump and through the check valves of the fuel pump to the carburetor and then if one or more of the above-mentioned conditions exist, the fuel will flow out to create an undesirable hazard. It is to be mentioned that one of the situations under which the fuel tank can be at a higher elevation than the carburetor is that of parking on an incline. This condition can arise with most any vehicle, but is somewhat more likely to occur if the vehicle is of the type that has the fuel tank mounted high within the vehicle body rather than below it as is frequently done.

Further discussion of the foregoing together with a different solution to the problem can be found in U.S. Pat. No. 3,368,538 to Pauli et al. dated Feb. 13, 1968 and entitled "Fuel Pump for Motor Vehicles."

BRIEF DESCRIPTION OF THE INVENTION

According to the present invention there is installed in the inlet side of a conventional fuel pump, a valve arrangement constructed in such a manner that a positive pressure in the inlet fitting will exert a pressure on a diaphragm which, in turn, creates a closing force on the inlet valve to the fuel pump. The diaphragm is provided with a greater effective area than the area of the valve seat so that the positive pressure exerts a positive closing force on the inlet valve. Relative areas between the valve seat and the diaphragm are such that only a small amount of negative pressure is required in the pumping chamber beneath the inlet valve to open the same and this negative pressure is then transmitted to the diaphragm so that the inlet valve can operate normally during engine operation.

DETAILED DESCRIPTION OF THE INVENTION

Figure 1:
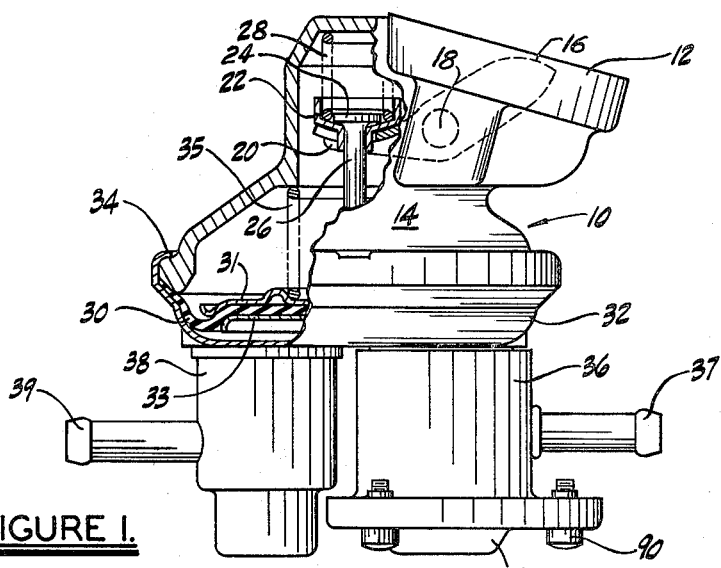
FIG. 1 is an overall view, partly in section, of a diaphragm fuel pump embodying the present invention.

The diaphragm fuel pump shown generally at 10 in FIG. 1 is of more or less conventional construction. A mounting flange 12 is a portion of a rigid pump body 14 and the flange is intended for use in attaching the pump to the engine of a vehicle. A lever 16 is provided for actuating the pump and does so by virtue of the fact that the free end of the lever is caused to reciprocate by a cam on the engine (not shown). Lever 16 is pivoted on a lever pin 18 and an inner end of the lever 20 moves a cup or thimble 22 which in turn causes a head 24 on a stem 26 to reciprocate as the pump is actuated. A lever return spring 28 is provided to maintain the lever arm 16 in contact with the cam at all times. Spring 28 is seated in cup 22 and bears at its other end against a portion of the pump body 14. A pumping diaphragm 30 is secured to body 10 by a cover 32 which constitutes a pumping chamber. Cover 32 is crimped to body 14 as shown at 34 to insure that the diaphragm 30 is securely clamped in place.

Attached to pumping chamber 32 is a cylindrical inlet tower 36 and a similar outlet tower 38. Tower 36 is provided with an inlet check valve 40 and tower 38 is provided with an outlet check valve 42. An inlet fitting 37 admits fuel from a source not shown and an outlet fitting 39 delivers fuel to a point of use such as the carburetor of an internal combustion engine.

Diaphragm 30 is sandwiched between upper and lower packing plates 31, 33 which in turn are fastened to stem 26 which actuates the diaphragm. A spring 35 biases the diaphragm, including packing plates, in a downward direction to create the pumping force as is usual in diaphragm fuel pumps.

Figure 2:
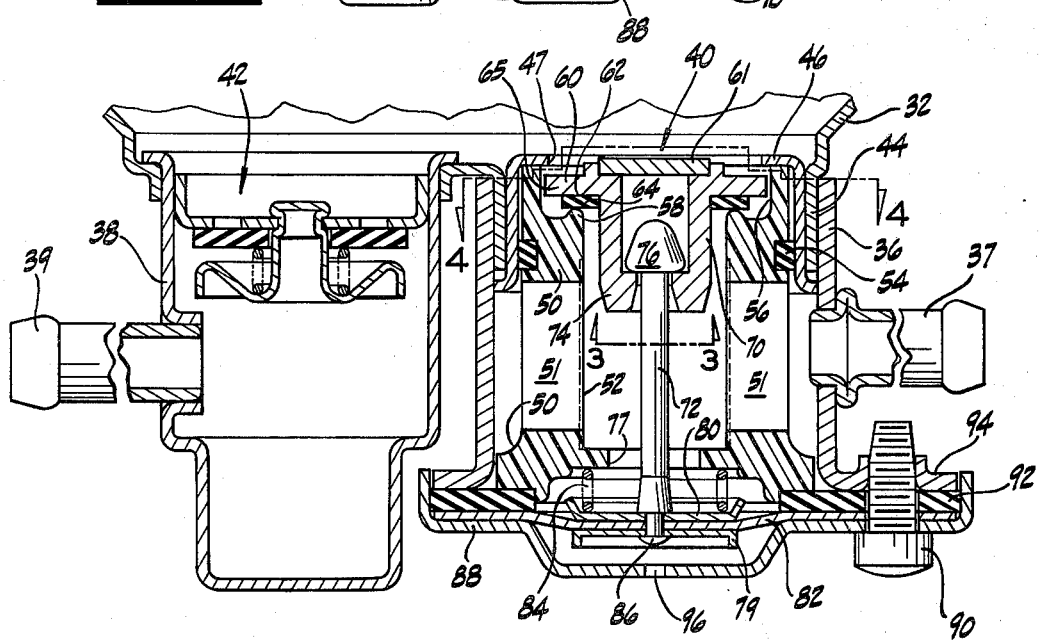
FIG. 2 is an enlarged sectional view of the inlet and outlet portions of the fuel pump with the inlet valve mechanism shown in detail.

Referring now to FIG. 2, the shut-off valve of the invention is shown in greater detail. Pumping chamber 32 has secured to it inlet tower 36 and outlet tower 38. Within the tower 36 is the inlet valve and shut-off valve subassembly 40 which is so constructed that it can be inserted and removed as a unit in the inlet tower 36. As shown in FIG. 2, inlet tower 36 is fastened to a tubular extension 44 of pumping cavity 32. Tower 36 can be fastened to the extension 44 by any desired means, for example, by press-fit or by brazing, welding, etc.

A cup 46 is fitted in tubular extension 44 and serves as a receptacle for the valve subassembly 40. Cup 46 is provided with a central opening 47 through which all pumped fluids pass during pumping. Cup 46 is preferably press-fitted into place but may be secured by any conventional assembly procedure such as by soldering, brazing, etc.

Valve subassembly 40 is comprised of a frame member 50 having upper and lower portions separated by longitudinal ribs 51. Ribs 51 support a filter or screen 52 which encircles the central portion of frame member 50. As shown, frame member 50 is made of plastic material which may be of molded construction. In such event, the filter or screen 52 can be integrally molded in place. Filter 52 may be of metal fabric or of plastic as desired. As shown in FIG. 2, the upper portion of frame 50 is provided with a resilient sealing ring 54 which seals the frame against cup 46. The upper portion of frame 50 includes a recessed area 56 which is provided with a valve seat 58 comprising a raised portion which encircles the central portion of frame 50 near the lowermost portion of the recess 56.

An inlet valve head 60 is fitted inside the recess 56 and includes a lower surface 62 for receiving a resilient sealing member 64. Surface 62 is further provided with a number of projections 65 which projections serve as guide members to guide the valve head 60 as it moves up and down within the recess 56.

Figure 3:
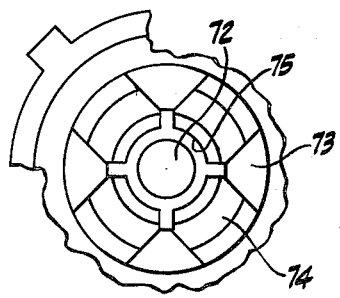
FIG. 3 is a planned view of a valve member for use in the invention.
Figure 4:
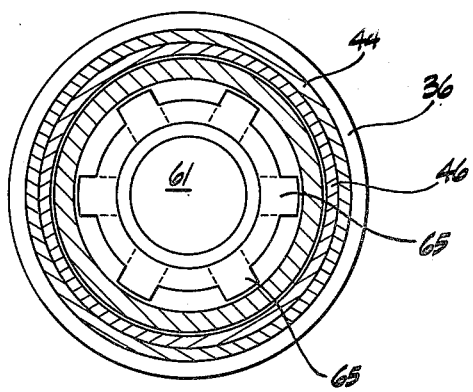
FIG. 4 is a section taken along the lines for FIG. 2.

Valve head 60 includes a sealing member 61 for closing off a central aperture which defines the interior of a tubular extension 70 which serves as a receptacle or pocket for a valve stem 72. The receptacle 70 is made up of a number of resilient fingers 74 (see FIG. 3) which fingers receive valve stem 72 as shown in FIG. 2. Stem 72 is provided with an enlarged head 76 which, during assembly, is forced through a central opening 75 defined by the fingers 74. Because the fingers are resilient, they can be forced outwardly to receive the head 76. As shown in FIG. 3, cutaway portions 73 are provided along the length of the fingers 74 to impart the required resiliency to the fingers.

Valve stem 72 passes through a central opening 77 in frame 50 and is attached by means of a pair of backing plates 79, 80 to a diaphragm 82. A light biasing spring 84 abuts a shoulder of frame 50 and backing plate 80 to urge the diaphragm away from frame 50. Stem 72 is headed at 86 to clamp backing members 79 and 80 and thereby secure the diaphragm and the backing members to stem 72. A cover member 88 is provided to secure the diaphragm to inlet tower 36. A plurality of bolts or other fasteners 90 are employed for securing cover 88 into place. A resilient sealing member 92 can be interposed between diaphragm 82 and a flange 94 of tower 36 if desired. An aperture or perforation 96 is provided in cover 88 so that the space between the diaphragm assembly and the cover will be maintained at atmospheric pressure. This allows the diaphragm to move upwardly and downwardly without interference from any vacuum or partial vacuum that might be created if the cover 88 were not vented.

While the fuel pump of the present invention is shown with the inlet and outlet fittings disposed below the main body of the pump, it is to be realized that the pump will operate equally well in the inverted position. In normal operation with the engine running, the cam of the engine will drive lever arm 16 in a reciprocal manner thus causing stem 26 to move up and down in relationship to the rotation of the engine. As stem 26 reciprocates the diaphragm 30 will also reciprocate and this, in turn, will cause alternate suction and discharge strokes of the pump. On the suction stroke, fuel will enter through inlet 37 and will pass through filter 52 to the interior of the frame member 50. The suction will also cause valve head 60 to move off the seat 58 and allow fuel to pass into the pumping chamber. At this point, diaphragm 82 will have moved upwardly as shown in FIG. 2 thereby compressing biasing spring 84 to some extent. Also at this point there will be a negative pressure in the pumping chamber and in tower 36 as well as in inlet fitting 37. This negative pressure can be expected to continue momentarily and when the pump stroke is reversed in the discharge direction, valve head 60 will return to seat 58 but stem 72 may have a tendency to remain more or less fixed due to the negative pressure acting on diaphragm 82. This is accommodated by the length of the tubular extension 70 which comprises the fingers 74 which fingers 74 are longer than the travel of valve head 60 or of diaphragm 82. Thus, in normal operation, the diaphragm 82 will reciprocate to any extent needed but may remain substantially stationary while the valve head 60 moves up and down in accordance with the action of the pump as it progresses through its suction stroke and discharge stroke.

When the engine is at rest, the biasing spring 84 will draw the valvehead 60 to the seated position even though there may be a negative pressure existing at the time. During this period of rest, any positive pressure that may be created in inlet fitting 37 will be transmitted to diaphragm 82. Diaphragm 82 has an effective area which is greater than the effective area of valve seat 58. Thus, the greater the positive pressure in the inlet 37, the greater will be the closing force to hold valve head 62 on seat 58. In practice, this difference in effective areas must be maintained within certain reasonable limits so that the suction created by the pumping diaphragm is sufficient to move diaphragm 82 even against a positive head in inlet 37.

Figure 5:
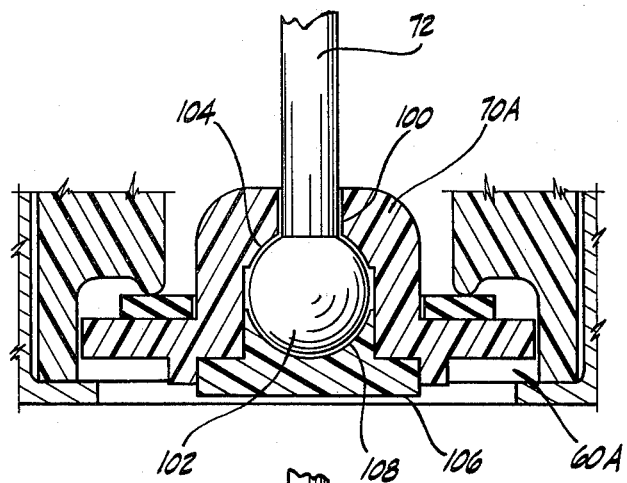
FIG. 5 shows an optional arrangement of a swivel joint for use with the valve member.
Figure 6:
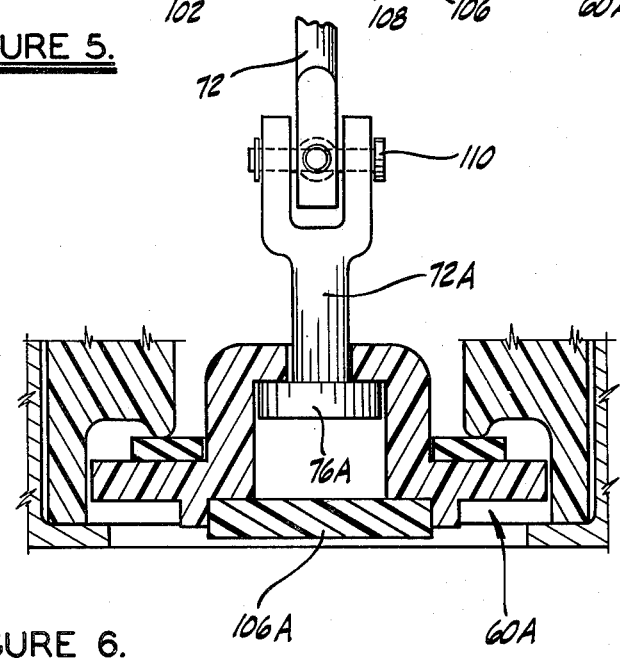
FIG. 6 is still another form of optional swivel mechanism for the valve member.

In the foregoing description, it is noted that the valve stem 72 is rigidly fastened to the diaphragm 82. It is well known that diaphragms do not necessarily move in a straight line manner and, therefore, some provision can or should be made for misalignment of the stem 72 with the valve head 60. In the embodiment shown in FIG. 2, this is provided for in that the head 76 of stem 72 is free to move within the tubular extension 70 and even if the stem 72 assumed an angular orientation the valve head 60 would still seat properly. In FIGS. 5 and 6 there are shown alternate forms of attachment of the stem 72 to the valve head.

In FIG. 5 a valve head 60A is provided with a tubular extension 70A having an opening 100 to receive the stem 72. The stem 72 is provided with a ball head 102. Accordingly, the extension 70A is provided with a rounded inner surface 104 to receive one portion of the head 102. Stem 72 and head 102 are secured in the valve head 60A by means of a plug 106 which also is provided with a rounded interior 108. Thus, there is formed a ball and socket connection between the stem 72 and the valve head 60A which, thus, provides compensation for any angularity that may exist between the valve head and the stem.

FIG. 6 shows still another modification in which the valve stem 72 is provided with a universal joint 110 of conventional construction and which is believed to need no further description. The universal joint 110 couples the stem 72 to a stem extension 72A which has a head 76A and which is secured in the valve head 60A by means of a flat plug 106A.

We claim:

1. In a mechanical fuel pump of the diaphragm type for use on an automotive vehicle for drawing fuel from a fuel source and delivering fuel to a point of use, said pump having a fuel inlet and a fuel outlet, said fuel outlet having an outlet check valve, the improvement comprising:
  an inlet structure secured to the pumping chamber of said fuel pump and in fluid communication therewith, a cover for said structure remote from said pumping chamber,
  a flexible diaphragm secured between said structure and said cover,
  an inlet valve seat in said structure adjacent said pumping chamber,
  a fuel inlet fitting in a wall of said structure, said fitting being positioned between said diaphragm and said valve seat,
  an inlet valve head including a sealing means between said valve seat and said pumping chamber, and valve stem means secured to said diaphragm at one end thereof and attached to said valve head at its other end said flexible diaphragm and said stem means being located upstream of said inlet valve head and in fluid communication with said fuel inlet fitting.

2. A fuel pump according to claim 1 in which the said valve seat is a part of a frame member inserted in said inlet structure and secured therein by said cover.

3. A fuel pump according to claim 2 in which the said frame member comprises the said valve seat at one end thereof and a lower portion separated from said seat by a plurality of ribs.

4. A fuel pump according to claim 3 further including filter means supported by said ribs.

5. A fuel pump according to claim 1 in which the said valve head is attached to the said stem by an alignment means for aligning said head against said valve seat at all times.

6. A fuel pump according to claim 5 in which said alignment means includes a head on said stem and a pocket receptacle on said valve head.

7. The fuel pump of claim 5 in which said alignment means comprises a ball and socket joint.

8. The fuel pump of claim 5 in which said alignment means comprises a universal joint.

9. A fuel pump according to claim 1 in which the relationship between the effective area of the said diaphragm and the area of the said inlet valve seat is such that a positive inlet pressure on the said inlet fitting will close the said valve head against the said seat when said pump is not in operation and will allow movement of said head away from said seat due to suction of said pump when said pump is in operation.

10. A fuel pump according to claim 9 further including a biasing spring for urging said diaphragm in a direction to move said head toward said seat.

* * * * *